Jan. 18, 1955      A. W. MEIER      2,699,935
MOTION DAMPENING DEVICE
Filed Aug. 7, 1953      3 Sheets-Sheet 1
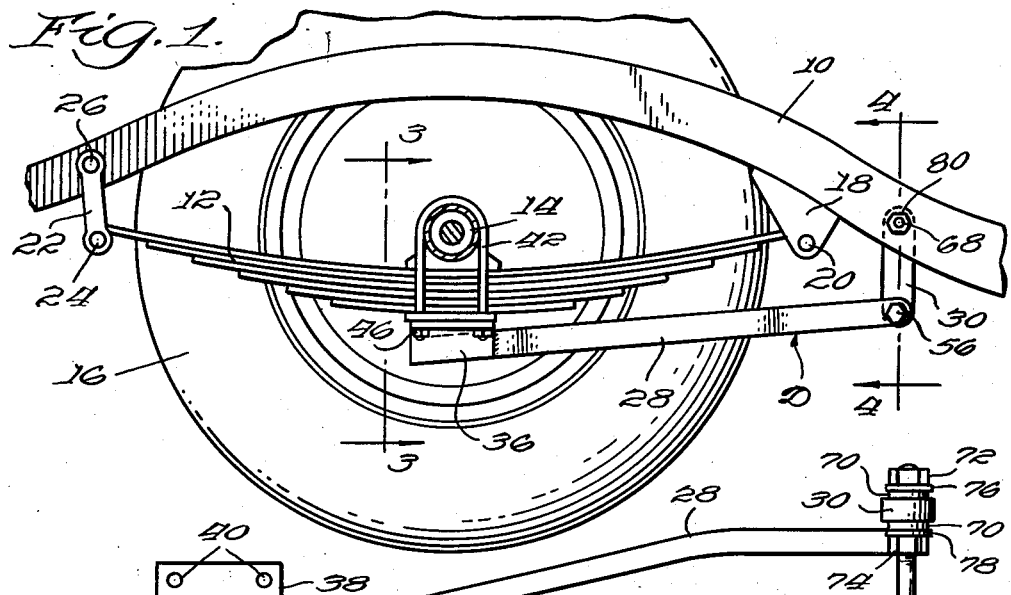
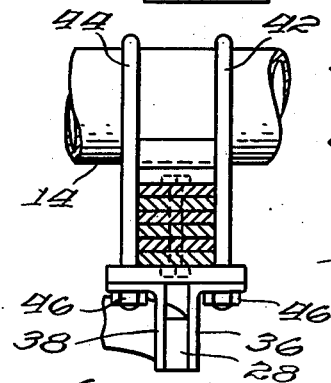
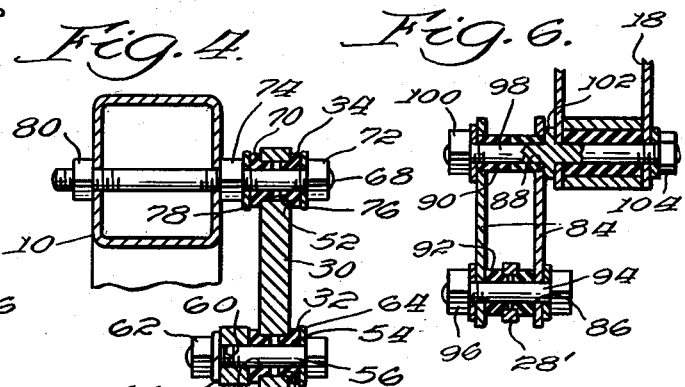
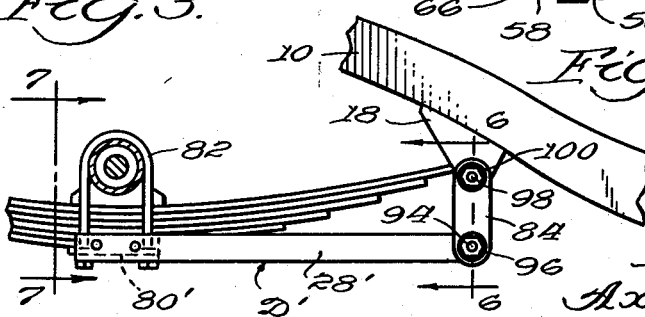
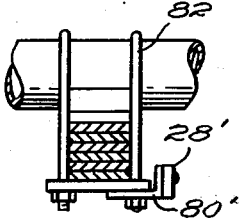
Inventor:
Axel W. Meier
By Fulwider and Mattingly
Attys.

Jan. 18, 1955  A. W. MEIER  2,699,935
MOTION DAMPENING DEVICE
Filed Aug. 7, 1953  3 Sheets-Sheet 2
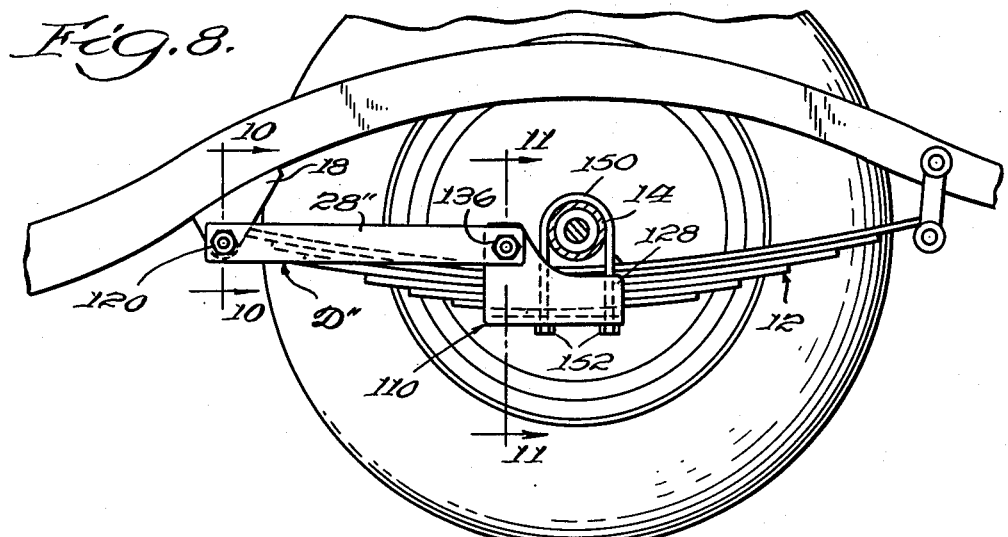
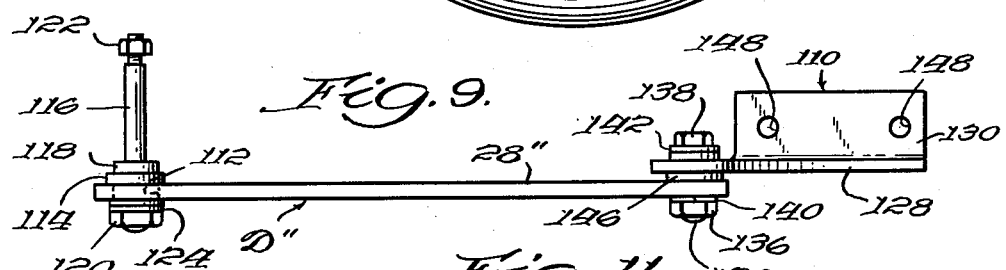
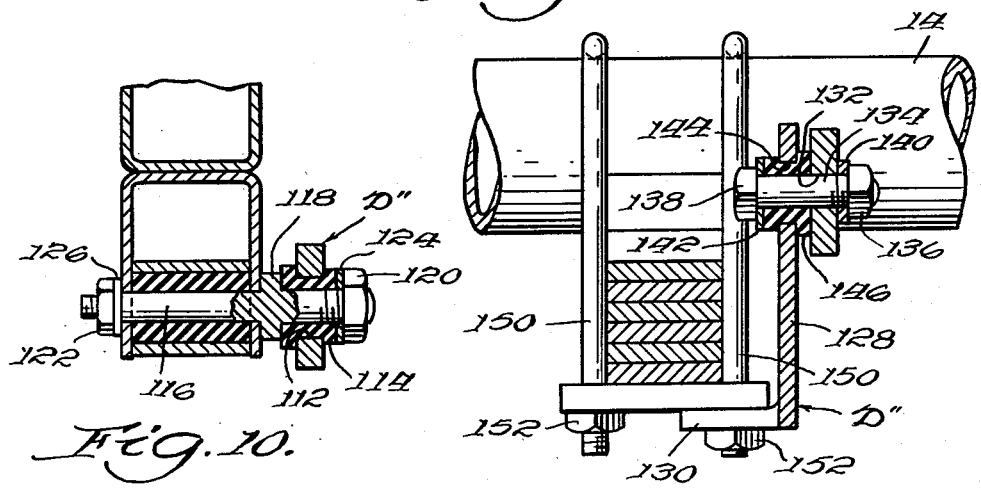
Inventor:
Axel W. Meier.
By Fulwider & Mattingly.
Attys.

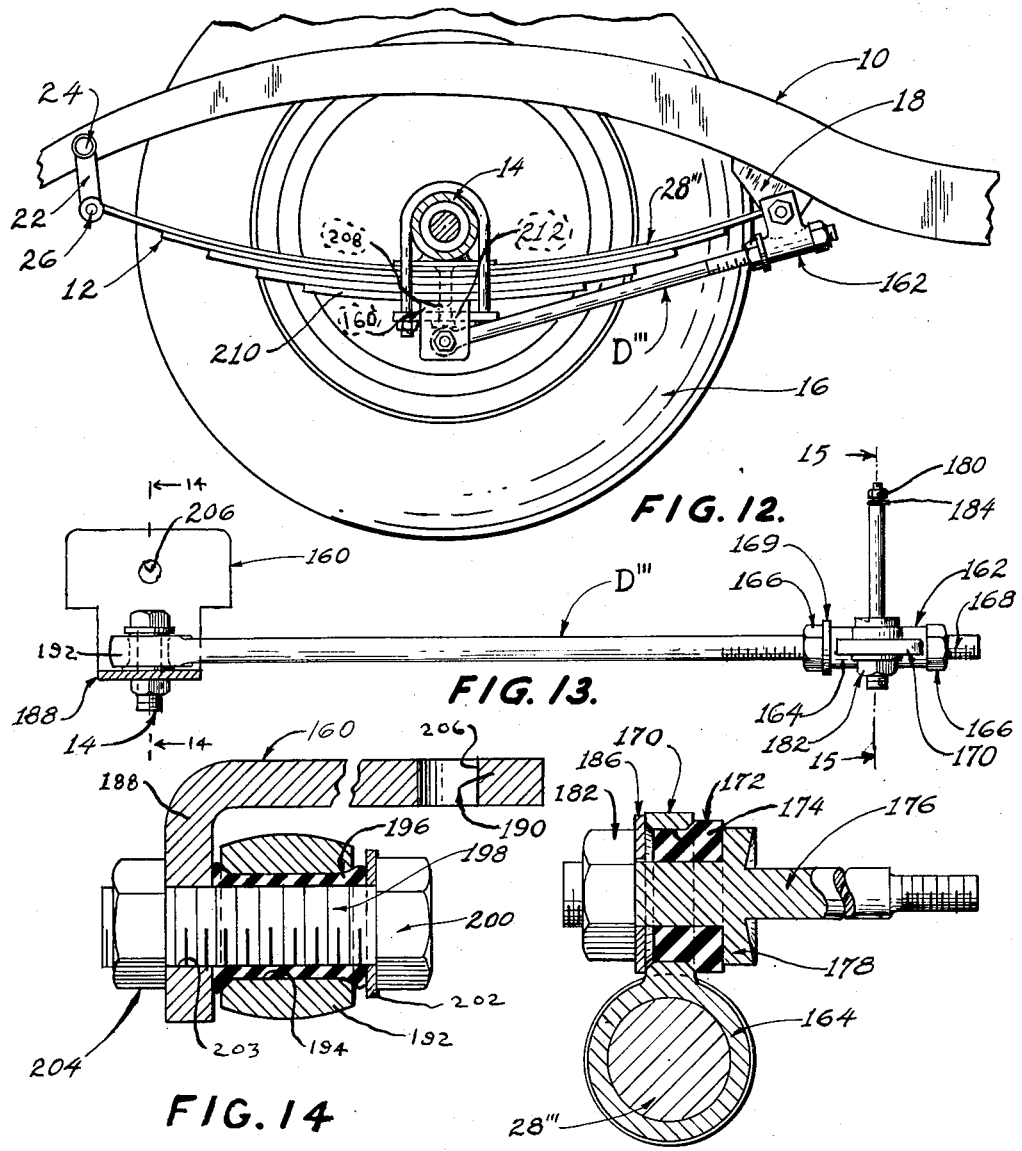

United States Patent Office 2,699,935
Patented Jan. 18, 1955

2,699,935

MOTION DAMPENING DEVICE

Axel W. Meier, Long Beach, Calif., assignor of one-half to Floyd A. Wilson, Bellflower, Calif.

Application August 7, 1953, Serial No. 372,873

6 Claims. (Cl. 267—66)

The present invention relates generally to the field of motor vehicles such as automobiles, buses and trucks, and more particularly to an improvement in the wheel suspension of an automobile.

This application is a continuation-in-part of application Serial No. 305,141, filed in the United States Patent Office on August 19, 1952, entitled "Motion Dampening Device," and now abandoned.

The majority of automobiles now in use incorporate a pair of longitudinally extending semi-elliptical leaf springs for mounting the rear wheels. Generally each of these springs is rigidly affixed to the outer end of one of the rear axles, the inner end of the axle being connected to the automobile differential. Power from the automobile engine is transferred to the rear axle through the differential, which latter device is actuated by the engine drive shaft. Since the front part of the engine drive shaft must remain fixed relative to the automobile frame while the differential is movable relative thereto, one or more universal joints must be included between the drive shaft and the differential.

With this arrangement, when the automobile is started into motion from a stationary position the initial power generated by the engine generally exceeds that transferred by the wheels to the ground, due to the inertia which must be overcome to set the car into forward motion. Since the rear wheels cannot rotate because of the resistance of their rubber tires, the momentary excess of engine power must be absorbed by the power train existing between the engine and the rear wheels. This power train comprises the drive shaft, one or more universal joints, the differential, the rear axle and the semi-elliptical springs. Inasmuch as these springs are the only part of the drive train which is comparatively resilient, they are caused to twist longitudinally by the momentary excess power. As the automobile commences to move forwardly from rest, the rear wheels are then capable of transmitting most of the engine power to the ground whereby the semi-elliptical springs may return to their normal configuration. The phenomena of spring twists occur not only when the automobile is started from rest, but also when a sudden burst of power is applied to the drive shaft by speeding up the engine, and also when the automobile is undergoing motion at a constant or increasing rate of speed and the driver's foot is removed from the accelerator, whereby engine speed of rotation is sharply reduced.

The existence of this spring-twisting phenomena requires a compromise in the selection of the semi-elliptical springs. If these springs are heavy and comparatively inflexible, they will be capable of absorbing a considerable amount of twist without danger. However, a comparatively inflexible set of springs provides a rough ride thereby causing discomfort to the passengers seated within the automobile. On the other hand, if a relatively flexible set of springs is provided, there is great danger that they will be damaged by the aforementioned twisting within a short period of time; such damage resulting from the progressive fatigue produced within the springs where they are caused to undergo many cycles of twisting. A comparatively flexible set of springs, however, is adapted to provide a ride of maximum comfort. Accordingly a serious problem exists as to the proper choice of these semi-elliptical springs.

It is a major object of the present invention to provide a novel motion dampening device which enables an automobile to be provided with comparatively flexible semi-elliptical springs whereby a comfortable ride is insured, without the danger that these springs will be damaged by excess twisting under the influence of the engine drive shaft.

It should also be noticed that with this type of wheel suspension, failure of the universal joint from momentary over-stressing is common, especially where comparatively inflexible heavy semi-elliptical springs are employed. Another object of the present invention is to provide a novel motion dampening device which when incorporated in the wheel suspension system of an automobile will prevent inadvertent failure of the universal joint of the automobile.

Another object of the present invention is to provide a novel motion dampening device which may be readily installed upon the wheel suspension system of existing automobiles by the use of ordinary tools and by persons not particularly skilled in the automotive art.

It is a yet further object of the invention to provide a device of the aforedescribed nature which will facilitate turning the automobile around corners, especially at high rates of speed.

A further object of the invention is to provide a device of the aforedescribed nature which is readily adjustable whereby it may be used with several types of automobiles without requiring any structural changes to either the device or to the automobile.

An additional object of the present invention is to provide a device of the aforedescribed nature which is simple of design and rugged of construction whereby it may have a long service life.

Other objects and advantages of the present invention will become apparent from the following detailed description of four embodiments thereof, taken in conjunction with the appended drawings wherein:

Figure 1 is a side elevational view showing a novel motion dampening device embodying the present invention when mounted on an automobile in operative position;

Figure 2 is a top plan view of said device;

Figure 3 is an end view of said device taken from a point indicated by line 3—3 of Figure 1;

Figure 4 is a vertical cross-sectional view taken on line 4—4 of Figure 1;

Figure 5 is a side elevational view showing a modified form of motion dampening device embodying the present invention mounted on an automobile in operative position;

Figure 6 is a vertical cross-sectional view taken on line 6—6 of Figure 5;

Figure 7 is an end view of the modified form of the device taken on line 7—7 of Figure 5;

Figure 8 is a side elevational view showing another modified form of motion dampening device embodying the present invention mounted on an automobile in operative position;

Figure 9 is a top plan view of the device shown in Figure 8;

Figure 10 is a vertical sectional view taken on line 10—10 of Figure 8;

Figure 11 is a vertical sectional view taken on line 11—11 of Figure 8;

Figure 12 is a side elevational view showing yet another modified form of motion dampening device embodying the present invention mounted on an automobile in operative position;

Figure 13 is a top plan view of the device of Figure 12;

Figure 14 is an enlarged vertical sectional view taken on line 14—14 of Figure 12; and Figure 15 is an enlarged vertical-sectional view taken on line 15—15 of Figure 12.

Referring to the drawings, and particularly to Figure 1, a novel motion dampening device, generally designated D, embodying the present invention is shown mounted on an automobile.

This automobile includes a chassis frame 10 which mounts a longitudinally extending semi-elliptical leaf spring 12, and an axle 14 which supports the rubber-tired wheel 16. The front end of the spring 12 is shown affixed to the frame 10 by means of a bracket 18 and a mounting pin 20, while the rear end of this spring is affixed to the frame by a bracket 22 and mounting pins 24 and 26.

The form of motion dampening device D shown in Figures 1 through 4 broadly comprises an elongated bar 28 shown rigidly connected at its rear end to the intermediate portion of the spring 12; a short lever 30 pivotally mounted at its lower end to the front of the bar 26 and at its upper end to the frame 10; and means 32 and 34 interposed between the lever and the bar, and between the lever and the frame, for resiliently resisting relative movement between these members.

More particularly, the elongated bar 28 will preferably be rectangular in cross section and formed of a suitable metal whereby it will have considerable resistance against bending. The means for securing it to the intermediate portion of the spring 12 will preferably comprise a pair of horizontally extending brackets 36 and 38 rigidly affixed, as by welding, to the rear end of the bar 28. These brackets may be formed with apertures 40 for receiving the lower threaded ends of a pair of U-bolts 42 and 44. Nuts 46 may be threaded upon the lower end of these U-bolts so as to secure these bolts to the brackets 36 and 48 with the upper ends of the bolts encompassing the axle 14. In this manner, the bar 28 will be securely connected to the mid-portion of the springs 12 with its length extending substantially longitudinally and forwardly relative to the frame 10.

The lever 30 may also be of rectangular cross section and formed of a suitable rigid metal. This lever is shown formed with transverse horizontal bores 50 and 52 at its opposite ends. The means for restraining relative rotation between the front end of the bar 28 and the lower end of the lever 30 will preferably comprise a pair of rubber-like bushings 54 mounted within the bore 50. The lever and the bar are shown pivotally interconnected by means of a horizontal pivot pin 56 extended between the bores 58 of the bushing 54 and a transverse horizontal bore 60 formed on the front end of the bar 28. In assembling the lever and the bar, a nut 62 is threaded upon the end of the pivot pin 56, which nut is tightened so as to compress the bushing 54 between a washer 64 spaced adjacent the head, the bolt 56, and the side of the bar 28 adjacent the lever. A lock washer 66 restrains the nut 62 from becoming unthreaded.

Likewise, the means for restraining relative rotation between the upper end of the lever 30 and an anchor pin 68 utilized to connect the upper end of the lever to the frame 10 will comprise a pair of rubber-like bushings 70 similar to the bushings 54. These bushings 70 are shown mounted within the horizontal bore 52. The anchor pin 68 is threaded whereby it may receive nuts 72 and 74, which nuts may be tightened so as to urge a pair of washers 76 and 78 toward each other whereby the bushings 70 are compressed. In this manner, relative rotation between the bushings and the lever will be restrained. The opposite end of the anchor pin 68 is also threaded whereby it may receive a nut 80 adapted to secure this pin to the frame 10, as clearly shown in Figure 4.

In operation, it will be apparent that the bushings 54 and 70 will resiliently resist vertical pivotal movement between the frame and the lever 30 and between the lever 30 and the bar 28. In this manner, motion of the spring 12 in a vertical plane will be effectively dampened whereby the spring is restrained against twisting about its longitudinal axis at such time as excess power is transmitted from the engine (not shown) to the axle 14 and the wheels 16. This is true since any tendency of the center portion of the spring to twist whereby the bar 28 would be moved in a direction along its longitudinal axis will be restrained by virtue of the resilient resistance offered by the bushings 54 and 70. Thus, it is possible to utilize a spring 12 which is comparatively flexible whereby a comfortable ride will be provided, yet the danger of breakage of this spring by repeated twistings is substantially minimized.

It should be particularly noted that the afore-described motion dampening device by dampening motion of the spring 12 in a vertical plane not only restrains it from twisting about its longitudinal axis, but also serves to restrain the spring against sudden flexing and unflexing as the wheels 16 strike a bump or projection in the road. For this reason an automobile equipped with one of these devices may provide a smoother ride than one not so equipped. Moreover, an automobile equipped with one of these devices will have less tendency to heel over during a turn than one not so equipped. This results from the restraining action of the device between the automobile's rear axle and its frame.

Referring now to Figures 5, 6 and 7, there is shown a modified form of motion dampening device embodying the present invention, which device D' is seen to be generally similar to that described above. The front end of the elongated bar 28', however, is connectible to the spring bracket 18, rather than to the frame 10 forward of such bracket, and this bar is straight rather than curved. The rear end of the bar 28' includes a single outwardly extending bracket 80', which bracket is apertured so as to receive the lower ends of a U-bolt 82.

As shown in Figure 6, a pair of levers 84 interconnect the front end of the bar 28' with the spring bracket 18. These levers 84 are each formed with transverse horizontal bores 86 and 88 at their opposite ends, which bores are each adapted to receive a pair of horizontally bored rubber-like bushings 90 and 92. Pivot pins 94 and 98 are securable within the bushings 90 and 92 by means of nuts 96 and 100. The pin 98 is extended to be rigidly secured to the spring bracket 18 by means of a nut 104. The operation of this form of the invention is similar to that described previously hereinbefore.

Referring now to Figures 8 through 11, there is shown another modified form of motion dampening device embodying the present invention. This form of device D'' includes an elongated bar 28'' connected at its front end to the spring bracket 18 and at its rear end to the front of a plate member 110. Resilient rubber bushing means are interposed between the front end of the bar 28'' and the spring bracket 18 and between the rear end of the lever 28'' and the plate member for restraining relative rotation in a vertical plane between these elements. The plate member 110 is rigidly affixed to the intermediate portion of the spring 12.

More particularly, the front end of the bar 28'' will be formed with a transverse horizontal bore 112 adapted to coaxially receive a rubber-like bushing 114 and an anchor bolt 116. The anchor bolt 116 is threaded at each of its ends and is formed with a collar 118 adapted to abut the outer surface of the spring bracket 18. Nuts 120 and 122, backed by washers 124 and 126, respectively, are tightened so as to secure the bar to the spring bracket. This arrangement is clearly disclosed in Figure 10.

The plate member 110 is L-shaped in vertical cross section having a vertical leg 128 and a horizontal leg 130 extending outwardly from the bottom of the vertical leg. The rear end of the bar 28'' is formed with a transverse horizontal bore 132 adapted to coaxially receive a pivot pin 134. This pin is threaded at both ends to receive nuts 136 and 138, backed by washers 140 and 142, respectively. The front upper portion of vertical leg 128 is formed with a transverse horizontal hole 144 adapted to coaxially receive a rubber-like bushing 146, which bushing is interposed between the inner surface of bar 28'' and the washer 142. This arrangement is clearly shown in Figure 11. The horizontal leg 130 is formed with a pair of vertical apertures 148 for receiving the lower threaded ends of a pair of U-bolts 150. Nuts 152 may be threaded upon the lower ends of these U-bolts so as to secure them to the plate member 110 and to the axle 14.

With the device D'' mounted as shown in Figures 8 through 11, the rubber-like bushings 114 and 146 will resiliently restrain vertical pivotal movement between the bracket 18 and the front of the bar 28'', and between the plate member 110 and the rear of the bar 28''. In this manner, twisting of the spring 12 in a vertical plane will be effectively dampened whereby the spring is restrained against twisting about its longitudinal axis.

Referring now to Figures 12 through 15, there is shown another modified form of motion dampening device embodying the present invention. This form of device D''' includes an elongated bar 28''' connected at its front end to the spring bracket 18 and at its rear end to a plate member 160. This plate member is adapted to be rigidly connected to the intermediate portion of the spring 12.

The device D''' differs from the hereinbefore-described motion dampening devices in that the effective length of the elongated bar 28''' may be adjusted. Such adjustability permits the device D''' to be utilized with several types of automobiles, each having a different distance between the axle 14 and the spring bracket 18. It likewise permits the device D''' to be utilized with different automobiles of the same type, which automobiles may actually incorporate different distances between their axle and their spring bracket even though they are of the same type. By virtue of this adjustability it is not necessary to make any structural changes to either the automobile or to the motion dampening device.

The front end of the bar 28''' is connected to the spring bracket 18 by means of an anchor member 162. This anchor member 162 includes a sleeve element 164 which is axially slidable along the elongated bar 28'''. The sleeve element 164 may be locked relative to the bar 28''' by means of lock nuts 166 that are threadedly engaged with threads 168 formed at the front portion of the bar. Washers 169 may be disposed between nuts 166 and the ends of the sleeve element 164. An integral lug 170 extends upwardly from the sleeve element 164, which lug is formed with a transverse horizontal bore 172. The latter bore coaxially mounts a rubber-like bushing 174 and an anchor bolt 176. The anchor bolt 176 is threaded at each of its ends and is formed with a collar 178 adapted to abut the outer surface of the spring bracket 18. Nuts 180 and 182, backed by washers 184 and 186, respectively, may be tightened so as to secure the bar 28''' to the spring bracket 18.

The plate member 160 is L-shaped in vertical cross section, having a vertical leg 188 and a horizontal leg 190 extending outwardly from the bottom of the vertical leg. The rear end of the bar 28''' is integrally formed with an eye 192 having a transverse horizontal bore 194 adapted to coaxially receive a rubber-like bushing 196 and a bolt 198 having a head 200. A washer 202 may be interposed between the end of the bushing 196 and the bolt head 200. The vertical leg 188 of the plate member 160 is formed with a transverse horizontal bore 203 for receiving the threaded end of the bolt 198. A nut 204 may be threaded upon this end of the bolt. The mid-portion of the horizontal leg 190 of the plate member is formed with a vertical aperture 206 for receiving the center spring bolt 208. The plate member 160 is interposed between the underside of the lowermost spring leaf 210 and the upper surface of the spring backing plate 212.

With the device D''' mounted as shown in Figures 12 through 15, the rubber-like bushings 174 and 196 will resiliently restrain vertical pivotal movement between the spring bracket 18 and the front of the elongated bar 28''', and between the plate member 160 and the rear of this bar. In this manner, twisting of the spring 12 in a vertical plane will be dampened whereby the spring is restrained against twisting about its longitudinal axis.

It should be observed that only one set of each of the parts of the device D''' need be made for use on both sides of the automobile. This is true because the anchor bolt 176 and the plate member 160 are of uniform configuration and hence may be rotated 360° for secural to the bore 172 and the bore 194, respectively.

While there has been shown and described four satisfactory forms of the present invention, it will be apparent to those skilled in the art that various modifications and changes may be made without departing from the spirit of the invention or the scope of the appended claims.

I claim:
1. In combination, a motor vehicle including a chassis, an axle, a semi-elliptical spring, a downwardly directed bracket mounted on said chassis and engaging one end of said spring, means connecting the other end of said spring to said chassis, said bracket including a transverse bore therein, coupling means between said spring and said axle spaced from said bracket, an elongate substantially horizontal rigid bar extending between said coupling means and said bracket, including a first end portion having a horizontal transverse bore therein and an opposite end portion, a plate including a horizontal portion and a vertical portion secured to said opposite end of said bar in substantially longitudinally fixed relation, a laterally removable horizontally extending securing means having a portion extending through the bore of said first end of said bar and through the bore of said bracket for lateral engagement and disengagement of said first end with said bracket, said horizontal portion being detachably securable to said intermediate securing means and being vertically releasable therefrom.

2. The combination as set forth in claim 1 in which said plate is L-shaped and said horizontal portion is vertically apertured and in which the vertically releasable securing means therefor includes U-bolts engaging said spring and axle and extending through the vertical apertures of said plate.

3. The combination as set forth in claim 2 further including a resilient bushing within said bracket for receiving said laterally removable horizontally extending securing means for restraining relative movement of said bar with respect to said bracket.

4. The combination as set forth in claim 1 including a resilient bushing within said bracket for receiving said laterally removable horizontally extending securing means for restraining relative movement of said bar with respect to said bracket.

5. A motion dampening attachment for use in inhibiting movement between a motor vehicle axle and chassis in which the axle is supported from the chassis by a semi-elliptical spring one end of which is pivotally connected to the chassis by a bracket affixed to the chassis and having a horizontal transverse bore therein, and an intermediate securing means coupling said spring and axle; said attachment comprising an elongate substantially horizontal rigid bar of fixed longitudinal dimension, a first end portion on said bar having a horizontal transverse bore formed therein, adapted for registration with the bore of said bracket, a laterally removable securing means for engaging said first end with said bracket, having a portion for extension through the bore of said bracket and extending through the bore of said bar for lateral engagement and disengagement of said end with said bracket, a plate including a vertical portion secured to the opposite end of said bar substantially in longitudinally fixed relation thereto, and a horizontal portion, said horizontal portion being detachably securable to said intermediate securing means and being vertically releasable therefrom.

6. The attachment as set forth in claim 5 including a resilient bushing secured between said arm and said plate.

References Cited in the file of this patent

UNITED STATES PATENTS

| | | |
|---|---|---|
| 792,777 | Kenehan | June 20, 1905 |
| 1,218,083 | Huff | Mar. 6, 1917 |
| 1,235,643 | Biederman | Aug. 7, 1917 |
| 1,620,093 | Fornaca | Mar. 8, 1927 |
| 1,722,426 | Kampfer | July 30, 1929 |
| 2,215,826 | Crane | Sept. 24, 1940 |
| 2,245,382 | Bradley et al. | June 10, 1941 |
| 2,308,967 | Kuss | Jan. 19, 1943 |
| 2,367,817 | Brown | Jan. 23, 1945 |

FOREIGN PATENTS

| | | |
|---|---|---|
| 18,155 | France | Dec. 4, 1913 |
| 28,019 | France | July 15, 1924 |
| 281,512 | Great Britain | Dec. 8, 1927 |